United States Patent [19]
Murphy

[11] Patent Number: 6,017,036
[45] Date of Patent: Jan. 25, 2000

[54] MECHANICAL SHAFT SEAL

[76] Inventor: Glendon W. Murphy, 1927 Maple Ave., Huntington, W. Va.

[21] Appl. No.: 09/207,726

[22] Filed: Dec. 8, 1998

[51] Int. Cl.[7] .................................................... F16J 15/38
[52] U.S. Cl. .......................... 277/385; 277/358; 277/377; 277/399
[58] Field of Search ................................... 277/370, 377, 277/385, 399, 358

[56] References Cited

U.S. PATENT DOCUMENTS

| | | | |
|---|---|---|---|
| 2,040,429 | 5/1936 | Corke | 277/370 |
| 3,025,070 | 3/1962 | Copes | 277/370 |
| 4,572,517 | 2/1986 | Rockwood et al. | |
| 5,403,020 | 4/1995 | McOnie | |
| 5,509,664 | 4/1996 | Borkiewicz | |
| 5,509,668 | 4/1996 | Kurita et al. | |
| 5,571,268 | 11/1996 | Azibert | 277/370 |
| 5,593,164 | 1/1997 | Mraz | |
| 5,662,340 | 9/1997 | Bessette et al. | |

*Primary Examiner*—Anthony Knight
*Attorney, Agent, or Firm*—Robert R. Waters

[57] ABSTRACT

The invention is a mechanical seal assembly for use between a stationary body and a rotating shaft. The seal assembly includes a stationary element, a rotating biasing element and a rotating tensioning element. The rotating biasing element is sealed to the rotating shaft utilizing an o-ring seal. The tensioning member is rigidly mounted to said shaft using an interference fit backed up by set screws or the equivalent. The stationary assembly is centered about the shaft and rigidly fastened to the stationary body. Either the stationary element or the rotating follower element may hold packing in a radial packing groove, as a sealing medium. An axial biasing force provided by coil springs (or other compressive means) on the periphery of the rotating follower plate and secured by the rotating tensioning element insures intimate contact of the packing medium to the stationary element and rotating biasing element sealing face, thus providing a fluid tight seal. In the preferred embodiment, the elements are provided as a fully split design, enabling this seal to be assembled on a rotating shaft without the necessity of access to the end of the shaft.

8 Claims, 3 Drawing Sheets

MECHANICAL SHAFT SEAL

BACKGROUND OF THE INVENTION

This invention generally relates to mechanical sealing assemblies. In particular, the invention relates to a mechanical seal assembly for use on a rotating shaft, and designed to provide strong sealing capabilities with low maintenance and long wear-life.

Mechanical seal assemblies are well known in the field of mixing and other rotating equipment, and the difficulties and challenges of a strong, low maintenance seal construction are also well known. In the usual application, the mechanical seal is subject to substantial friction wear, thermal degradation, and corrosion. In addition, mechanical seal assemblies are often called upon to provide a vapor or pressure seal such as, for example, mixing applications for the food or chemical industries. In these situations, thermal degradation, friction, corrosion or shaft wear can create more pronounced problems since even a modest degradation of the seal surface could result in the loss of pressure or a vacuum loss and could provide a means for contamination.

In most constructions, the mechanical seal is mounted to the housing at the point in which the rotating shaft exits the housing. Friction from the point of contact between the housing, the shaft and the seal assembly is thus concentrated in one or more finite areas, and these areas become maintenance focal points. To accomplish the actual seal, disposable packing material is often interposed within the seal assembly to sustain the friction and thermal degradation. As a result of such wear and abrasion, the disposable packing material must be periodically replaced. The equipment must usually be taken out of service during packing replacement and often the shaft, housing, or other attachments must be removed in order to accomplish the packing replacement.

With many conventional sealing assemblies, a common problem experienced is that since stationary packing material is applied directly to the rotating shaft, continued rotation of the shaft serves to wear away or compress the packing material or its housing. As a result, a path for contamination develops and a pressure tight environment inside the mixing or pumping housing cannot be maintained. Various prior art devices have addressed this problem with varying degrees of success. In U.S. Pat. No. 5,571,268 by Azibert, various means are used to direct pressure inward toward the shaft to maintain a seal including use of a plastic strap with handles (FIG. 11). In U.S. Pat. No. 5,509,664 by Borkiewicz, a plurality of mated circumferential seal segments are arranged about the rotating shaft, and these seal segments are subjected to a circumferential force by means of compression coil springs.

Other disadvantages often featured in prior art devices include the feature that often the sealing means is achieved with an elastomeric O-ring or other gasket material that functions at the point of contact between the rotating and stationary members. While a more pliable member is helpful to form a pressure and vapor-tight seal, such construction is not optimum because a pliable medium located at the precise point of contact between the stationary and rotating surfaces deteriorates quickly, resulting in substantial maintenance and inspection efforts.

Another serious disadvantage of many conventional seal assemblies found in the prior art is that they are ill equipped for use on a rotating shaft that has been damaged by many years of use. It is not uncommon in many process industries to find rotating shaft equipment that is fifty or more years old with shaft surfaces that are worn and pitted due to heavy usage. With many conventional seal assemblies, the members are constructed such that a pressure tight seal cannot be achieved on an imperfect shaft. In fact, the nature of many conventional seals is such that they greatly contribute to the degradation of the shaft surface in the vicinity of stationary housing, leading to considerable down time and expense in replacing or repairing the shaft.

Another problem that often compromises the usefulness of many prior art devices is that if the shaft is bent or the bearings worn, the shaft will not turn true relative to the housing. This problem is known as "runout", and it creates a sealing problem for many prior art devices that are dependant on a stable perpendicular alignment between the shaft and the housing.

Some of the problems associated with replacement of mechanical seals can be overcome through the use of a split seal assembly. Split seal constructions are well known in the art and provide the advantage that removal of the shaft or motor housing is normally not required since the split mechanical components can be concentrically disposed around the shaft without removal. In many split seal constructions, the seal consists of at least two sealing rings either axially spaced from each other or adjacent to each other. In most constructions, one seal ring is mounted or attached to the shaft and rotates with the shaft while the other is mounted or biased to a stationary housing.

One example of a fully split mechanical seal assembly can be found in U.S. Pat. No. 5,662,340 by Bessette et al. The Bessette device provides inherent advantages over many seals in the prior art, yet still features the disadvantage that the direct point of sealing contact is directly upon the shaft. Therefore, this device does not address the goal of protecting the shaft from inordinant wear. Furthermore, the sealing properties may be compromised if the rotating shaft in question features a pitted or imperfect surface.

U.S. Pat. No. 5,403,020 to McOnie discloses a split seal device which features a vulcanized rubber insert which engages a fractured seal ring to the rotating shaft. A series of additional fractured rings and other rotary bodies are attached to and between the rubber insert and a stationary body to form the seal. The McOnie device purports to be inexpensive and easy to manufacture, and that the diametrically opposed, uneven fractured lines of the ring members aid in preventing leaks. A minimum number of the parts are subject to wear resulting in reduced maintenance costs. However, the McOnie device features a large number of parts, and the nature of the device is such that the end of the rotary shaft must be fully accessible for the initial installation. Applicability to existing shafts, especially one with an imperfect surface, could be questionable.

SUMMARY OF THE INVENTION

The object of this invention is to provide a mechanical seal pack assembly for use on a stationary housing to seal a rotating shaft that is mounted in and protruding from the stationary housing. A further object of this invention is to overcome the limitations of prior seal assemblies by providing a stronger seal with a longer life expectancy of the packing and sealing face such that maintenance efforts and down time are greatly reduced. A further object of this invention is to provide a seal assembly that can be used on a pitted or imperfect rotary shaft without compromising seal integrity, while protecting the shaft from further degradation and wear. In addition, the seal of the present invention is much less affected by "runout" of the shaft caused by worn bearings or other problems in maintaining a steady alignment of the shaft.

A further object of this invention is to provide a sealing assembly utilizing less expensive replacement components, i.e. steel follower plate, and packing. As such, the present device represents a substantial improvement over some prior art devices in which carbon, ceramic or tungsten carbide seal faces must be periodically replaced.

In the preferred embodiment of the invention, this seal assembly is a split mechanical seal assembly which facilitates ease of installation on existing rotating shaft equipment without the necessity of removing the shaft or other major disassembly. As an alternative to the preferred embodiment, the seal assembly can be constructed as a non-split assembly for an original installation or for use in scenarios where the disassembly effort required is not as extensive and/or down time is not as critical.

The primary components which make up the elements of the invention can be made from a variety of typical materials. For example, the plates may be bronze, steel, carbon-graphite, ceramic, polymeric, or a combination thereof.

The present invention operates to seal a shaft using all conventional types of packing material. The packing material can be made of a wide variety of raw material such as cotton fiber or fiberglass and may or may not be coated with material such as teflon. The packing may be cut in graduating lengths or wrapped spirally in the stationary plate.

BRIEF DESCRIPTION OF THE DRAWINGS

Additional utility and features of this invention will become more fully apparent to those skilled in the art by reference to the following drawings, wherein all components are designated by like numerals and described more specifically.

DETAILED DESCRIPTION OF THE DRAWINGS

Figure 1:
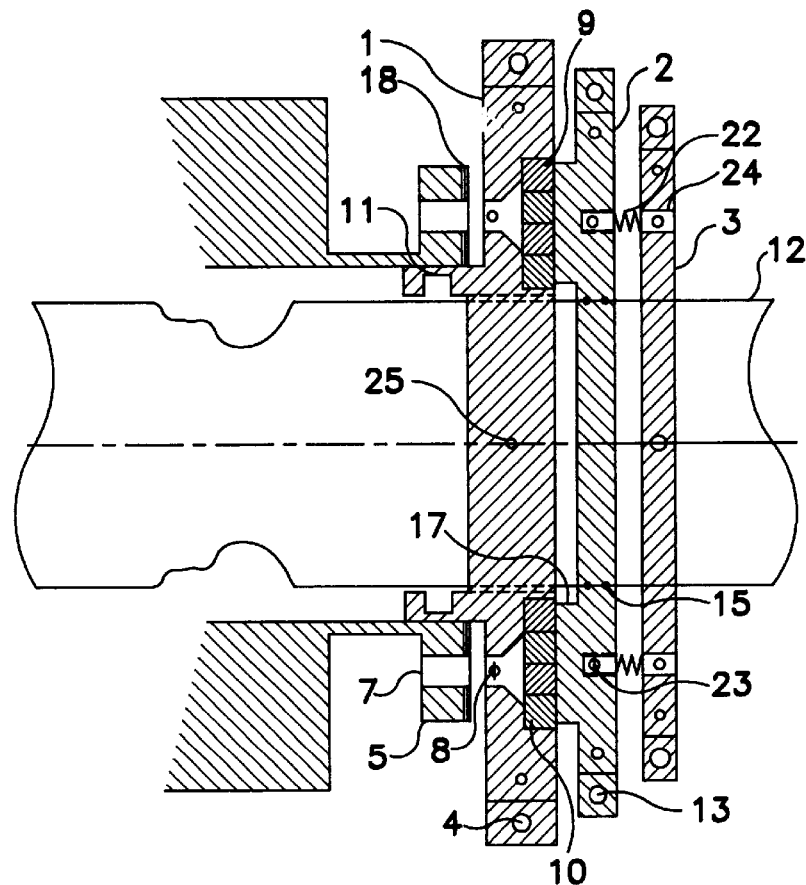
FIG. 1 is a sectional elevation view of the completed assembly of the mechanical shaft seal according to this invention mounted on a stationary housing and a rotating shaft.
Figure 2:
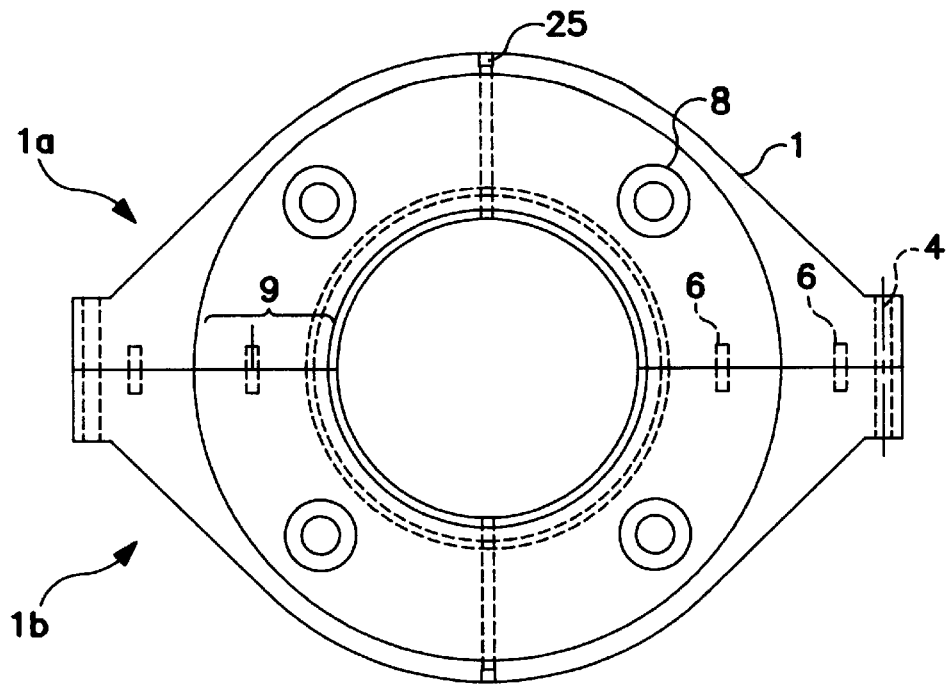
FIG. 2 is an elevation view of the concave, exterior side (relative to the housing) of the seal pack stationary plate.

FIG. 2 depicts the sealpack stationary plate 1, which is one of the three primary elements, comprising the mechanical split seal in the preferred embodiment of the invention. The stationary plate 1 consists of two split sections 1a and 1b, which are held together by a pair of bolts (not shown) inserted in respective sockets 4 and four dowel pins 6 that align the two halves of the stationary plate together. Alternative means of attachment may also be utilized. Stationary plate 1 is constructed such as to define a concave area, 9, in order to contain the packing material 10 (shown in FIG. 1).

The stationary plate 1 also features four recessed apertures 8 within which four countersunk bolts (not shown) are utilized to secure the stationary plate 1 to an external wall 5 of the stationary body housing using bolt holes 7 as illustrated in FIG. 1. A conventional gasket 18 is situated between stationary plate 1 and the external wall 5 of the stationary housing to insure a tight fit. As an alternative, a collar or spacer can be used to situate the entire seal assembly away from the stationary body housing.

In order to provide lubrication, a groove 11 is located next to the rotating shaft, as shown in FIG. 1 to hold a grease seal. Lubricating grease is provided to the surface between the packing material 10 and the ring shaped follower extension 17 through grease ports 25.

Figure 3:
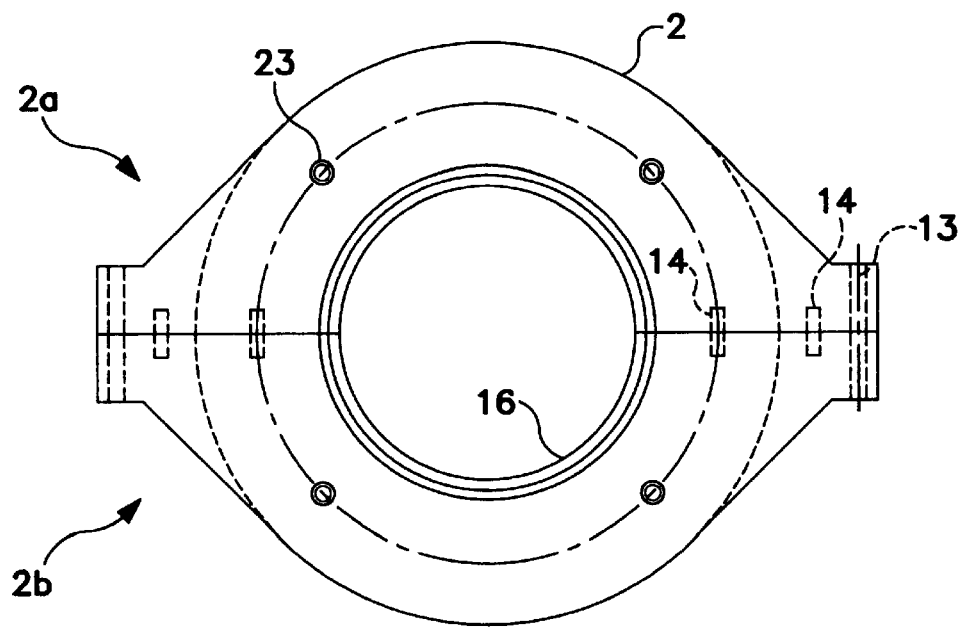
FIG. 3 is an elevation view of the exterior side (relative to the housing) of the seal pack follower plate.
Figure 5:
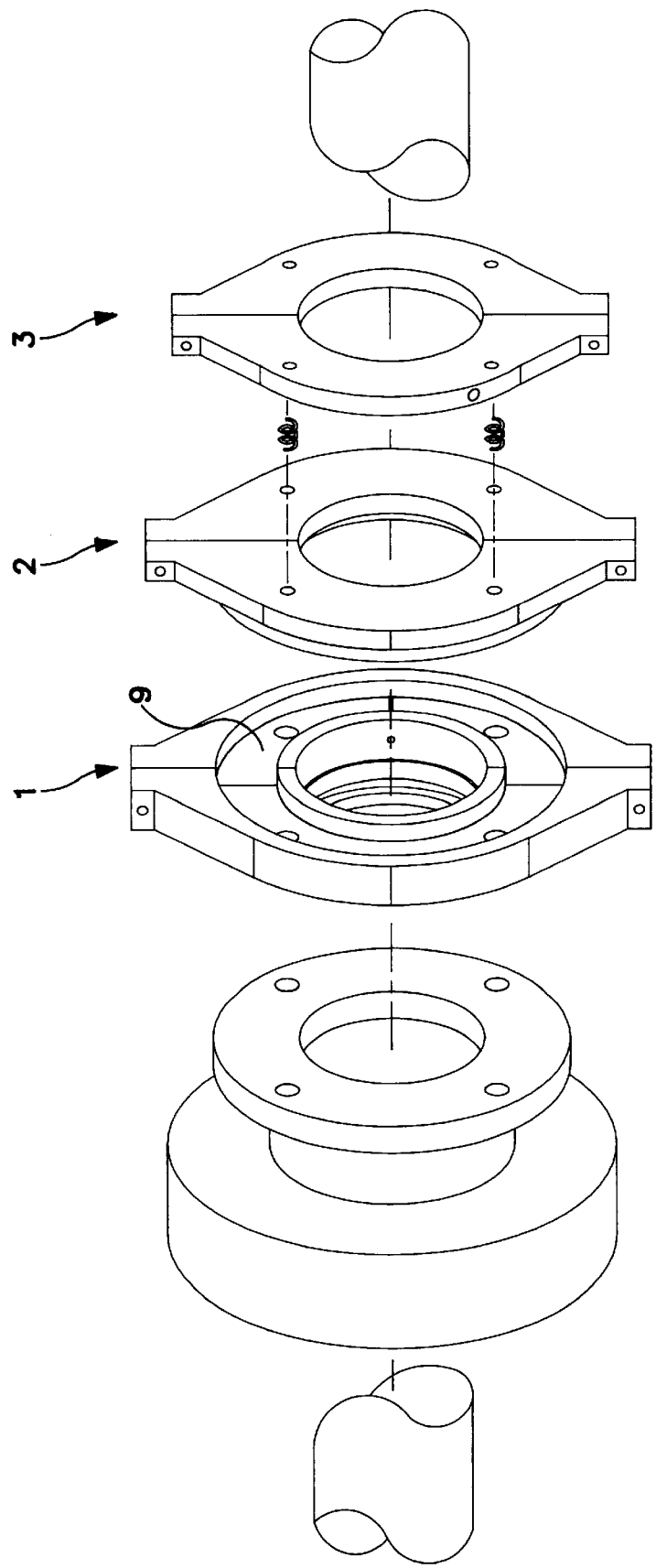
FIG. 5 is an exploded view of the three primary components of the mechanical shaft seal of the present invention.

FIG. 3 depicts the sealpack follower 2 which consists of two split sections 2a and 2b. The follower plate 2 is held together by a pair of bolts (not shown) inserted in sockets 13 and four dowel pins 14 that lock the two halves of the plate together as shown. The follower plate creates the seal between the rotary shaft 12 and the stationary plate 1.

Two interior grooves 16 are formed on the inner surface of the follower plate immediately adjacent to drive shaft 12. Fitted within the groove 16 is at least one (preferably two) O-ring(s) 15 to insure a tight seal between the drive shaft 12 and the follower plate 2. The follower plate 2 includes a ring-shaped extension 17 that matches essentially the packing material 10 in the stationary plate 1. The surface where the packing material 10 and the ring shaped extension 17 make contact forms a seal. Since the follower plate 2 moves with the drive shaft 12, the ring-shaped extension 17 moves in a circle while pressing against the packing material 10.

Figure 4:
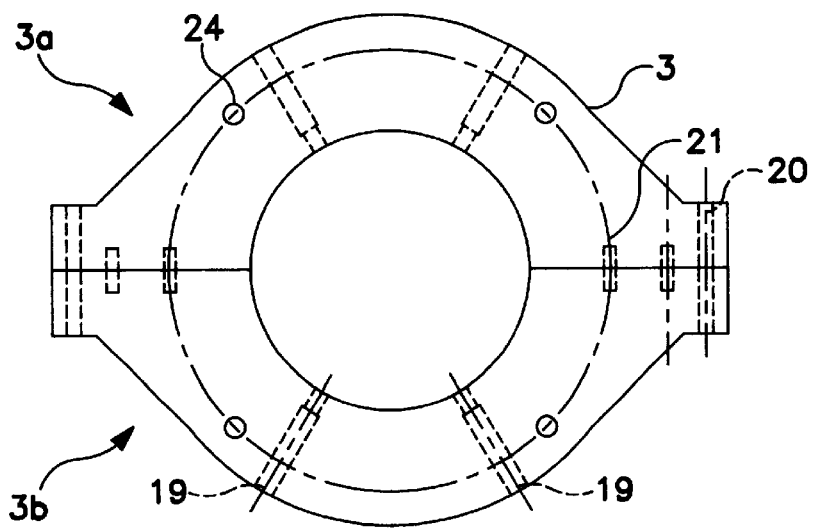
FIG. 4 is an elevation view of the exterior side (relative to the housing) of the seal pack tensioning plate.

Both the tensioning plate 3 and the follower plate 2 turn with the shaft. The tensioning plate 3, as depicted in FIG. 4, is used to hold the follower plate 2 on the drive shaft 12 and maintain pressure on the seal between the follower plate 2 and the packing material 10. The tensioning plate 3 consists of two split sections 3a and 3b, and is held together by a pair of bolts (not shown) inserted in respective sockets 20 and four dowel pins 21 that align the two halves of the tensioning plate together. The tensioning plate includes four tapped holes 19 which are perpendicular to the shaft and counter-bored into the interior of the tensioning plate as shown in FIG. 4. Four set screws (not shown) are utilized to secure the tensioning plate 3 to the drive shaft 12 through the tapped holes 19, although other means of attachment may also be utilized.

In order to provide a constant biasing pressure to urge the follower plate 2 toward packing material 10, four coil springs 22 are placed between the tensioning plate 3 and the follower plate 2. Four holes 23 are drilled and tapped in the follower plate 2 as shown in FIG. 3 and four matching holes 24 are drilled into tensioning plate 3 as shown in FIG. 4. For assembly, four stud bolts (not shown) are tightened into the follower plate 2, and the coil springs 22 are mounted on the protruding stud bolts. Next, the tensioning plate 3 is slid onto the stud bolts and four nuts (not shown) are tightened onto the outside of the tensioning plate 3 such as to urge tightly the tensioning plate 3 against the follower plate 2 which in turn is urged tightly against packing material 10. This assembly is then affixed to the drive shaft 12 using the four set screws inserted through counterbored holes 19. Once the assembly is securely affixed to the drive shaft 12, the four nuts (not shown) are removed and the coil springs 22 will provide tension causing a seal against the packing material 10. As the packing material 10 recedes and compresses through normal wear and deterioration, the compressed coil springs 22 continue to urge the follower plate into the concave packing recess of stationary plate 1.

I claim:

1. A mechanical seal assembly for sealing between a stationary housing and a rotating shaft, comprising:

a stationary plate having an inner wall and an outer wall, said inner wall to be located closely adjacent to the position of said rotating shaft extending therethrough, and said outer wall to be radially located away from said shaft such as to define a radially extensive recess in said stationary plate such as to contain a packing material, and said stationary plate to be mounted to said stationary housing;

a follower plate having an inner edge and an outer edge, said inner edge to be located closely adjacent to said rotating shaft extending therethrough, said follower plate further defined to include a convex portion extending parallel to said shaft and defined to bias closely and extend into said recess in said stationary plate; and a tensioning plate having an inner edge and an outer edge, said inner edge to be adjacent to and mounted to said rotating shaft extending therethrough, said tensioning plate further defined to include a biasing means for applying pressure parallel to said shaft against said follower plate in the direction of said stationary plate.

2. The mechanical seal assembly of claim 1, further characterized in that said stationary seal plate is comprised of a pair of stationary plate segments, such segments to be disposed axially relative to said rotating shaft with means of attaching said segments to form a continuous stationary seal plate.

3. The mechanical seal of claim 1, further characterized in that said follower plate is comprised of a pair of rotary plate segments, such segments to be disposed axially relative to said rotating shaft with means of attaching said segments to form a continuous follower plate.

4. The mechanical seal of claim 1, further characterized in that said tensioning plate is comprised of a pair of rotary plate segments, such segments to be disposed axially relative to said rotating shaft with means of attaching said segments to form a continuous tensioning plate.

5. A split mechanical seal assembly for sealing between a stationary housing and a rotating shaft, comprising:

a pair of stationary plate segments, such segments to be disposed axially relative to said rotating shaft such as to form a stationary plate having an inner wall and an outer wall, said inner wall to be located closely adjacent to the position of said rotating shaft extending therethrough, and said outer wall to be radially located away from said shaft such as to define a radially extensive recess in said stationary plate such as to contain a packing material, and said stationary plate to be mounted to said stationary housing;

a pair of rotary plate segments, such segments to be disposed axially relative to said rotating shaft such as to define a follower plate having an inner edge and an outer edge, said inner edge to be located closely adjacent to said rotating shaft extending therethrough, said follower plate further defined to include a convex portion extending parallel to said shaft and defined to bias closely and extend into said recess in said stationary plate; and a pair of rotary plate segments, such segments to be disposed axially relative to said rotating shaft such as to define a tensioning plate having an inner edge and an outer edge, said inner edge to be adjacent to and mounted to said rotating shaft extending therethrough, said tensioning plate further defined to include a biasing means for applying pressure parallel to said shaft against said follower plate in the direction of said stationary plate.

6. The mechanical seal assembly of claim 1 or claim 5, further characterized in that the means of mounting the tensioning plate to the rotating shaft is set screws.

7. The mechanical seal assembly of claim 1 or claim 5, further characterized in that the biasing means for applying pressure parallel to said shaft against said follower plate is a spring.

8. A split mechanical seal assembly for sealing between a stationary housing and a rotating shaft, comprising:

a pair of stationary plate segments, such segments to be disposed axially relative to said rotating shaft such as to form a stationary plate having an inner edge and an outer edge, said inner edge to be located closely adjacent to said rotating shaft extending therethrough, said stationary plate further defined to include a convex portion extending parallel to said shaft and defined to extend away from said stationary housing;

a pair of rotary plate segments such segments to be disposed axially relative to said rotating shaft such as to define a follower plate having an inner edge and an outer edge, said inner edge to be located closely adjacent to said rotating shaft extending therethrough, said outer edge to be radially located away from said shaft such as to define a radially extensive recess in said follower plate such as to contain a packing material, and said follower plate further defined to bias closely to said stationary plate to closely fit inside the stationary plate upon compression of said packing material; and a pair of rotary plate segments, such segments to be disposed axially relative to said rotating shaft such as to define a tensioning plate having an inner edge and an outer edge, said inner edge to be adjacent to and mounted to said rotating shaft extending therethrough, said tensioning plate further defined to include a biasing means for applying pressure parallel to said shaft against said follower plate in the direction of said stationary plate.

* * * * *